(12) United States Patent
Goerend

(10) Patent No.: US 12,422,004 B1
(45) Date of Patent: Sep. 23, 2025

(54) TRANSMISSION CHANNEL PLATE

(71) Applicant: Goerend Transmissions, Inc., Saint Lucas, IA (US)

(72) Inventor: David J. Goerend, Saint Lucas, IA (US)

(73) Assignee: Goerend Transmissions, Inc., Saint Lucas, IA (US)

( * ) Notice: Subject to any disclaimer, the term of this patent is extended or adjusted under 35 U.S.C. 154(b) by 0 days.

(21) Appl. No.: 18/884,516

(22) Filed: Sep. 13, 2024

(51) Int. Cl.
*F16D 48/02* (2006.01)

(52) U.S. Cl.
CPC .................................. *F16D 25/14* (2013.01)

(58) Field of Classification Search
CPC ..... G01M 13/022; G01M 13/02; F16D 25/14; F16H 61/0009; F16H 2061/0062
See application file for complete search history.

(56) References Cited

U.S. PATENT DOCUMENTS

| | | | | |
|---|---|---|---|---|
| 4,210,034 A | * | 7/1980 | Younger | F16H 61/0009 60/458 |
| 2012/0186554 A1 | * | 7/2012 | Goerend | F16H 57/0452 123/196 R |
| 2014/0366669 A1 | * | 12/2014 | Goerend | F16H 61/0276 74/473.11 |
| 2017/0219091 A1 | * | 8/2017 | Dial | F16H 61/30 |
| 2019/0003576 A1 | * | 1/2019 | Hardin | F16H 61/0206 |
| 2020/0080625 A1 | * | 3/2020 | Downs | F16D 25/0638 |

* cited by examiner

*Primary Examiner* — Lori Wu
(74) *Attorney, Agent, or Firm* — McKee, Voorhees & Sease, PLC

(57) ABSTRACT

A channel plate for automatic transmission includes a substantially thickened area to prevent warpage of the plate during transmission operation. The plate includes ports for checking the oil pressure of the transmission clutch packs. Recesses are formed in the plate around the ports so that that plate sits flush within the test pan for pressure testing.

15 Claims, 10 Drawing Sheets

TRANSMISSION CHANNEL PLATE

TECHNICAL FIELD

The invention is directed toward a transmission channel plate having increased thickness to prevent warpage, and having cutouts surrounding the ports used for clutch pack oil pressure testing.

BACKGROUND

Original equipment transmissions include a cast channel plate to control oil flow through the transmission clutch packs. The plate is covered by a transmission pan. When it becomes necessary to check the oil pressure of the clutch packs, the pan must be removed, and replaced with a test pan having hollow standpipes which align with ports in the plate. An adapter tube is inserted through one of the standpipes and threadably coupled to the plate port. Then, a pressure gauge is attached to the outer end of the adapter, for measuring the clutch pack oil pressure as the engine runs and the transmission operates.

The original equipment channel plates are relatively thin, and subject to warpage due to high temperatures within the transmission. Aftermarket plates with an increased thickness can be substituted for the original equipment plate, and are less likely to warp due to the greater thickness. However, the increased thickness of the aftermarket plate does not accommodate the test pan, because the increased thickness of the plate prevents the test pan from being sealingly mounted to the transmission, since the standpipes abut the second plate. Thus, the aftermarket thicker plate precludes use of the test pan such that the clutch pack oil pressure cannot be tested, because the plate will not sit flush in the test pan.

Accordingly, a primary objective of the present invention is the provision of an improved channel plate which overcomes the problems of the prior art.

A further objective of the present invention is the provision of a channel plate with increased thickness to prevent warpage, and recesses around the pressure test ports to allow the plate to flushingly fit in the test pan.

Another objective of the present invention is the provision of an aftermarket transmission channel plate that resists warping and allows testing of clutch pack oil pressure.

These and other objectives become apparent from the following description of the invention.

SUMMARY

A transmission channel plate is provided for use in an automatic transmission. The plate has an area with increased thickness, as compared to an original equipment channel plate. Threaded ports are provided in the thickened area to allow oil pressure testing for the clutch packs of the transmission. The ports are threaded to connect to a pressure gauge adapter extending through a standpipe of a pressure test pan substituted for the original equipment pan of the transmission. Recesses are formed around the ports in the thickened area of the plate so that the plate will mount or sit flush within the test pan, such that the test pan can be sealingly mounted to the transmission so that the clutch packs can be pressure tested. Each recess may be formed around one or multiple ports. The ports receive a threaded plug for normal operation of the transmission, and the plugs are removed for testing the oil pressure of the clutch packs.

DETAILED DESCRIPTION

Figure 1:
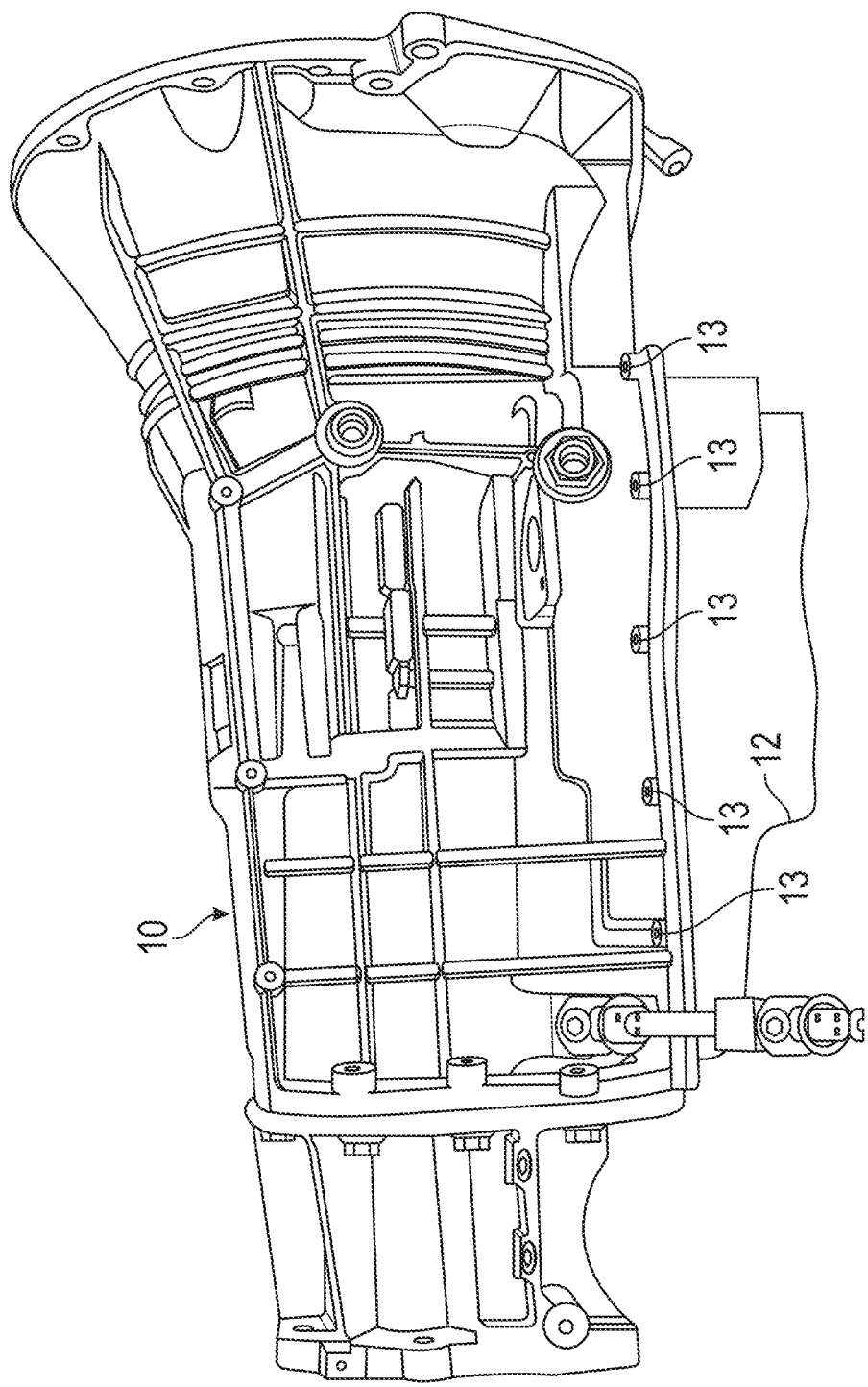
FIG. 1 is a side elevation view of a conventional transmission.
Figure 3:
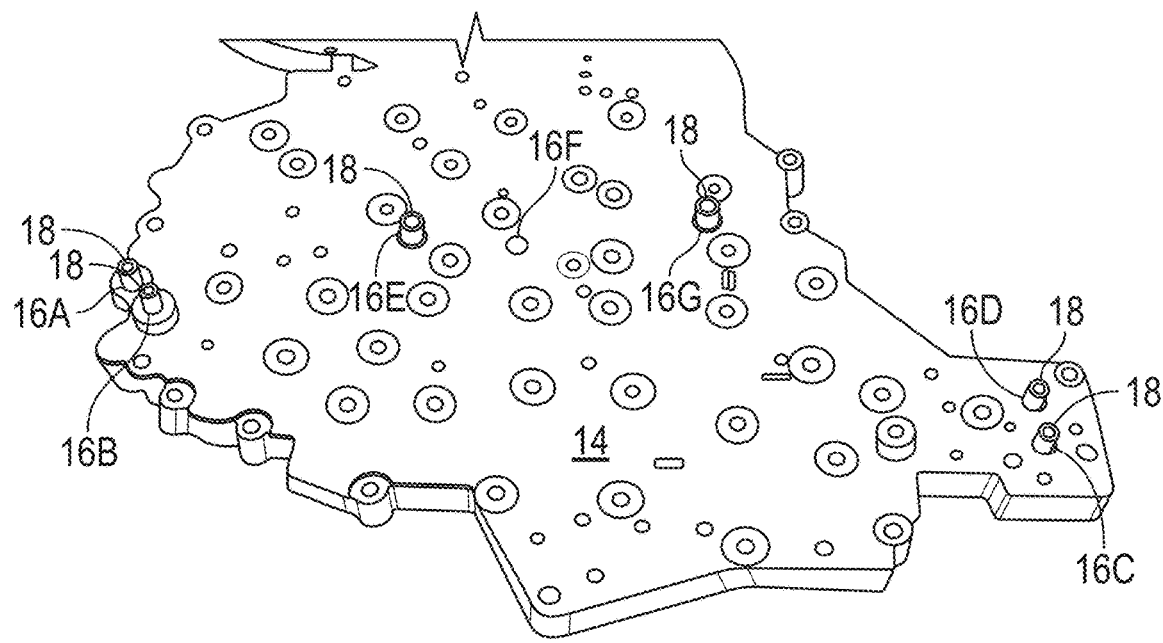
FIG. 3 is a view showing the exterior surface of an original equipment channel plate.

A conventional automatic transmission, such as for a Chrysler vehicle, is designated in FIG. 1 by the reference 10. The transmission 10 includes a lower pan 12 removably mounted on the bottom of the transmission 10 by a plurality of bolts 13. An original equipment cast channel plate 14 is shown in FIG. 3. The plate 14 has a series of ports 16A-G which are used when testing oil pressure in the transmission clutch packs (not shown). The ports 16A-G are normally closed by plugs 18, and the plugs 18 are removed for testing oil pressure of the clutch packs. Port 16A is for reverse clutch pressure; port 16B is for underdrive clutch pressure; port 16C is for line pressure; port 16D is for low/reverse clutch pressure; port 16E is for the second clutch pressure; port 16F is for the fourth clutch pressure; and port 16G is for the overdrive clutch pressure. It is understood that the number and location of the ports may vary depending on the transmission make and model.

Figure 2:
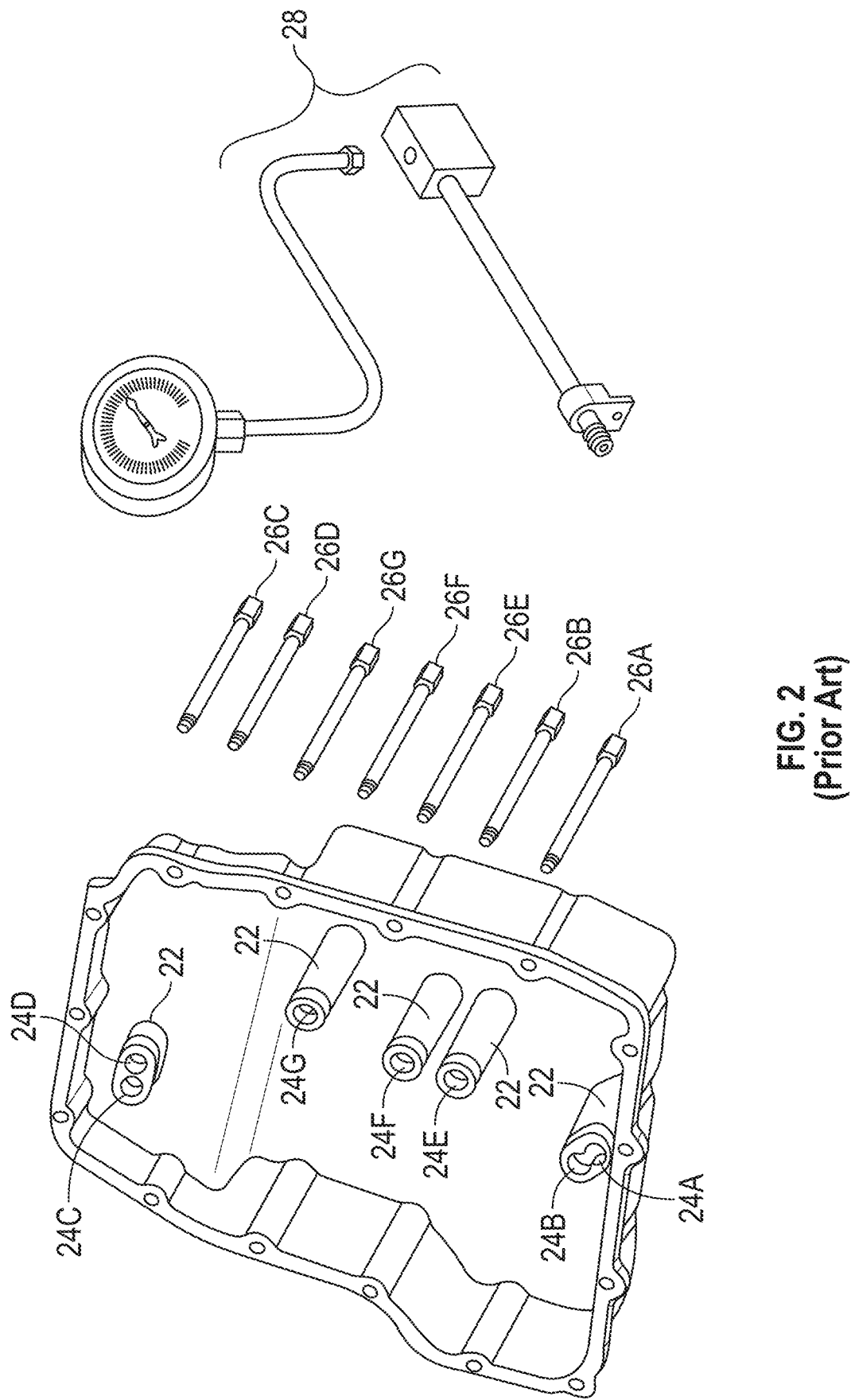
FIG. 2 is an exploded view of the conventional components used in testing the clutch pack oil pressure.
Figure 4:
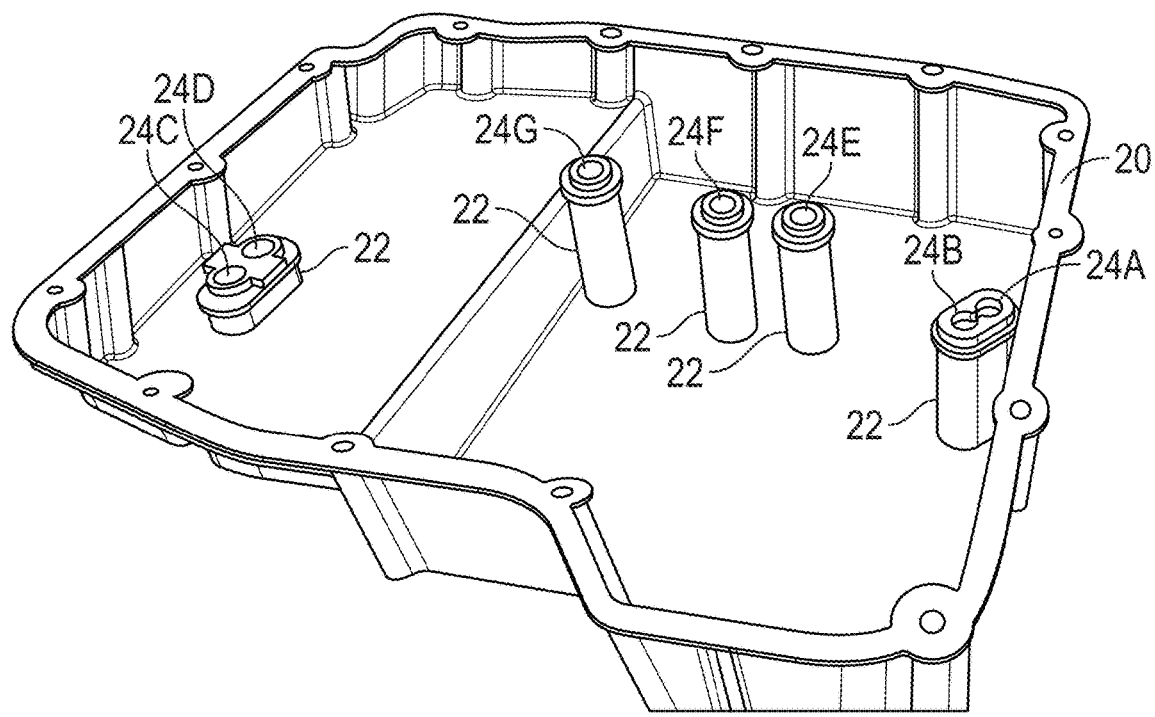
FIG. 4 is a perspective view of a conventional test pan with standpipes used in testing the clutch pack oil pressure.
Figure 5:
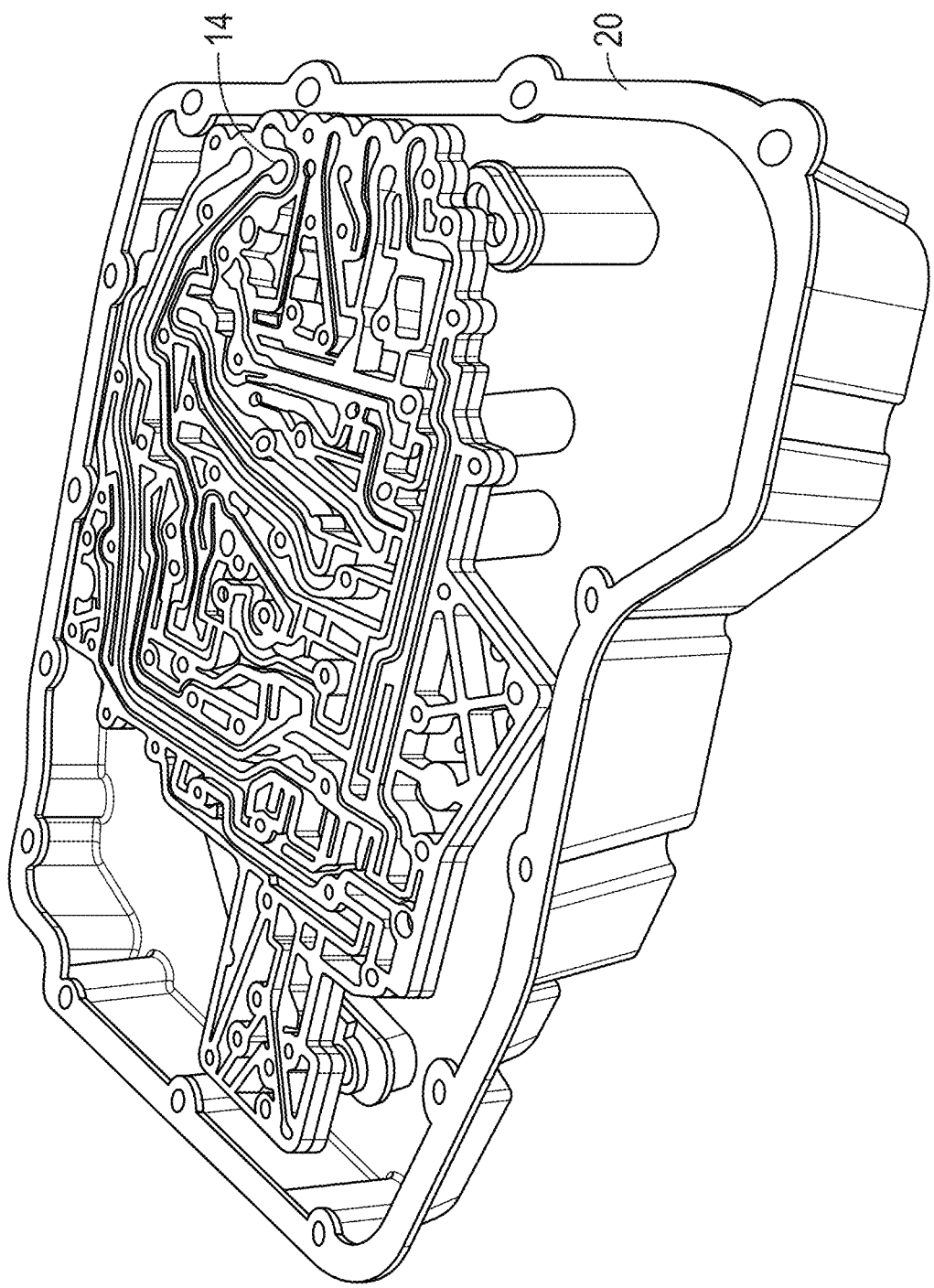
FIG. 5 is a perspective view showing the original equipment channel plate of FIG. 3 positioned within the test pan of FIG. 4.

FIG. 4 shows a conventional pressure test pan 20, which is substituted for the original transmission pan 12 when oil pressure needs to be tested. The test pan 20 includes a plurality of hollow standpipes 22 which extend from the bottom to the top of the test pan 20. Preferably, the test pan 20 is molded plastic, such that the standpipes 22 are integrally formed with the body of the pan 20. The standpipes 22 are hollow so as to have an axial opening 24A-G which align with the ports 16A-G, and is adapted to receive pressure test adapters 26A-G. A pressure gauge assembly 28 is operatively connected to the adapters 26A-G for testing the transmission oil pressure. The testing components shown in FIG. 2, and their use, is conventional.

Figure 6:
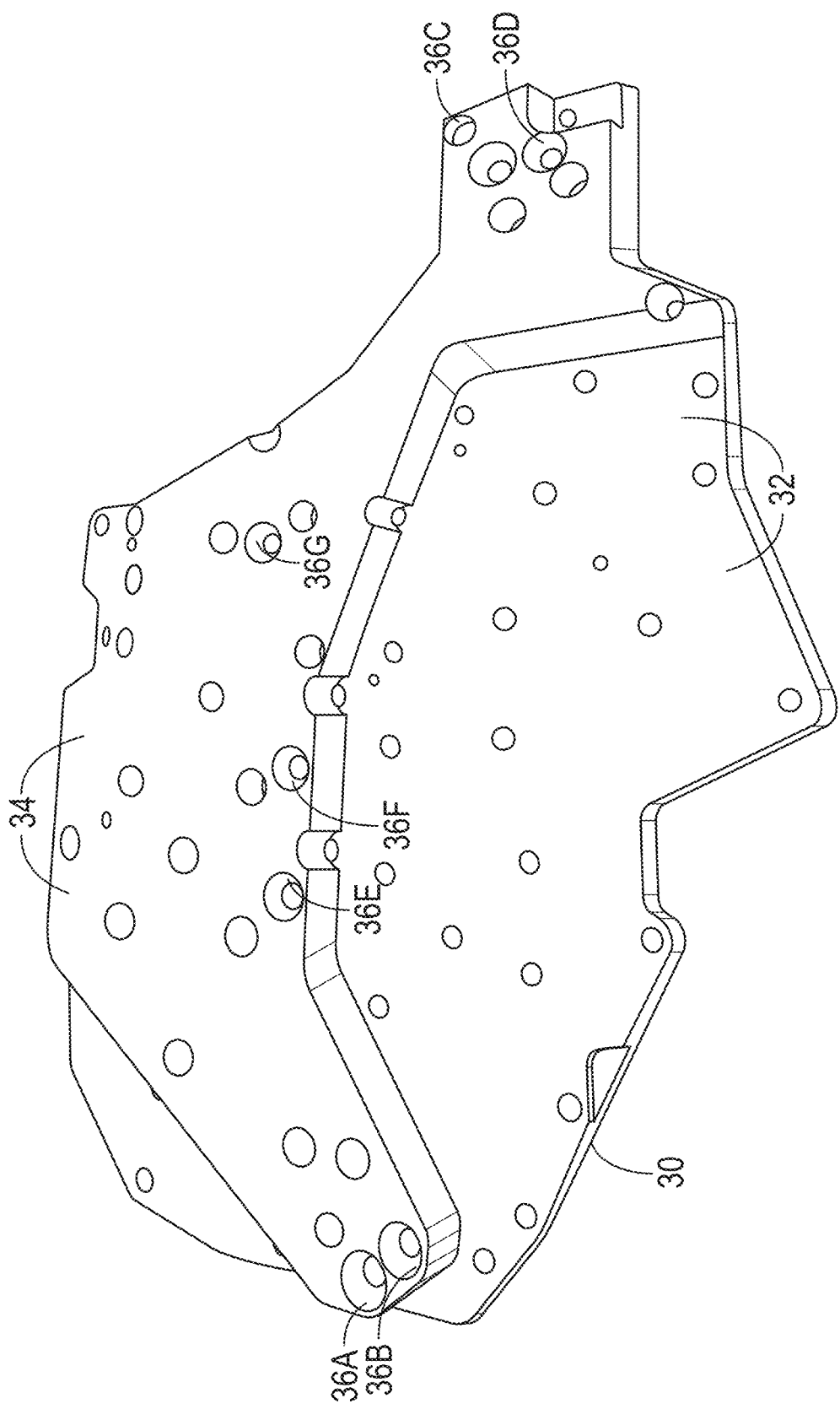
FIG. 6 is a view showing one example of a prior art aftermarket channel plate with a thickened area and pressure test ports.
Figure 7:
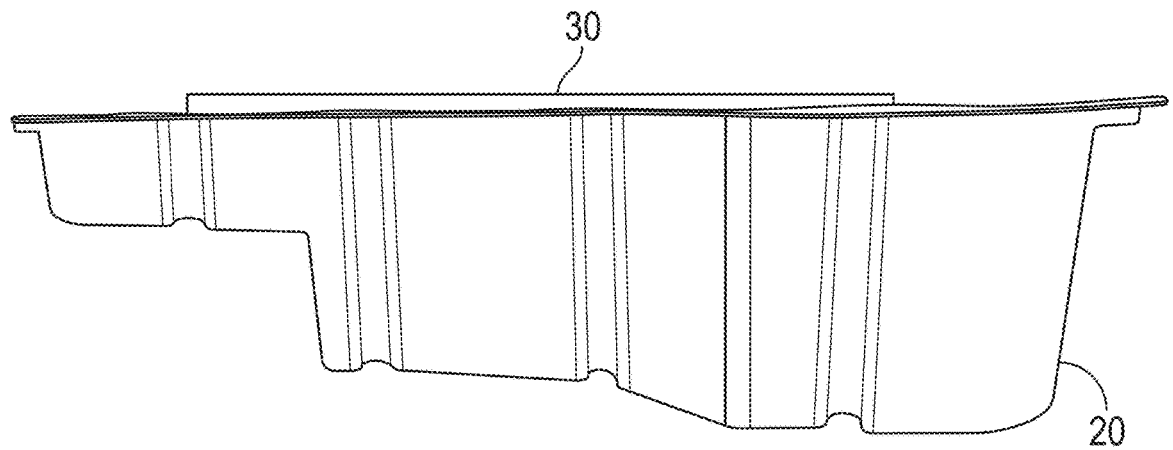
FIG. 7 is a side elevation view of the test pan with the aftermarket plate of FIG. 6 positioned therein.
Figure 8:
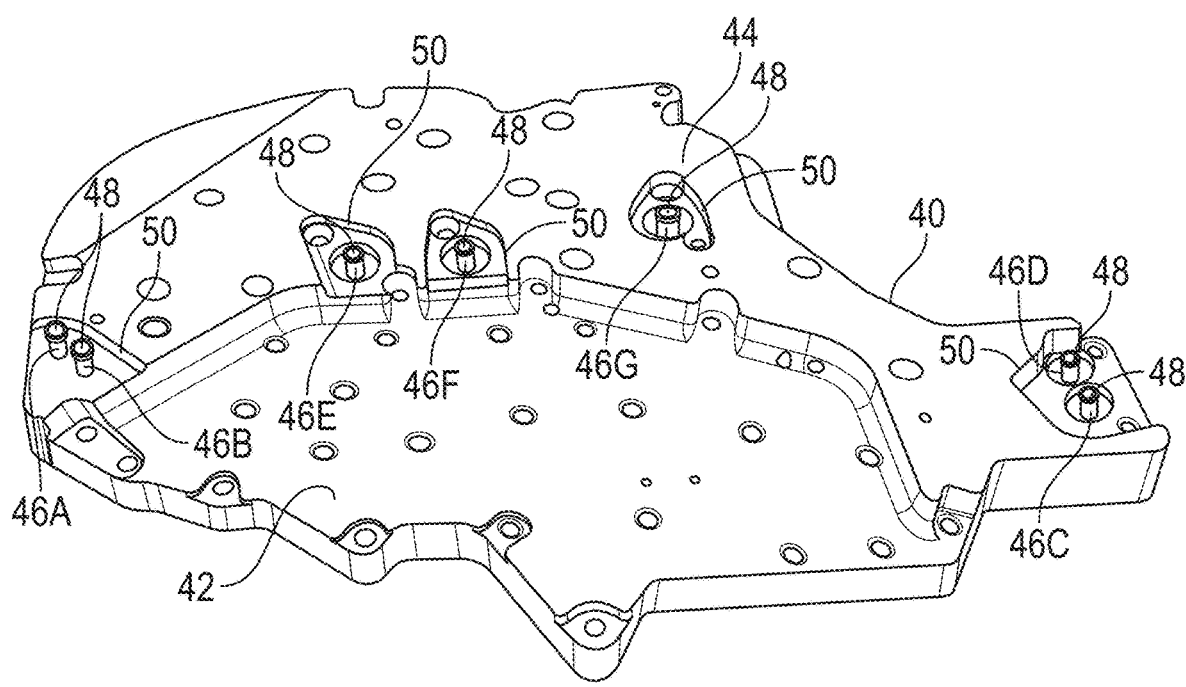
FIG. 8 is a perspective view of the improved channel plate according to the present invention.
Figure 9:
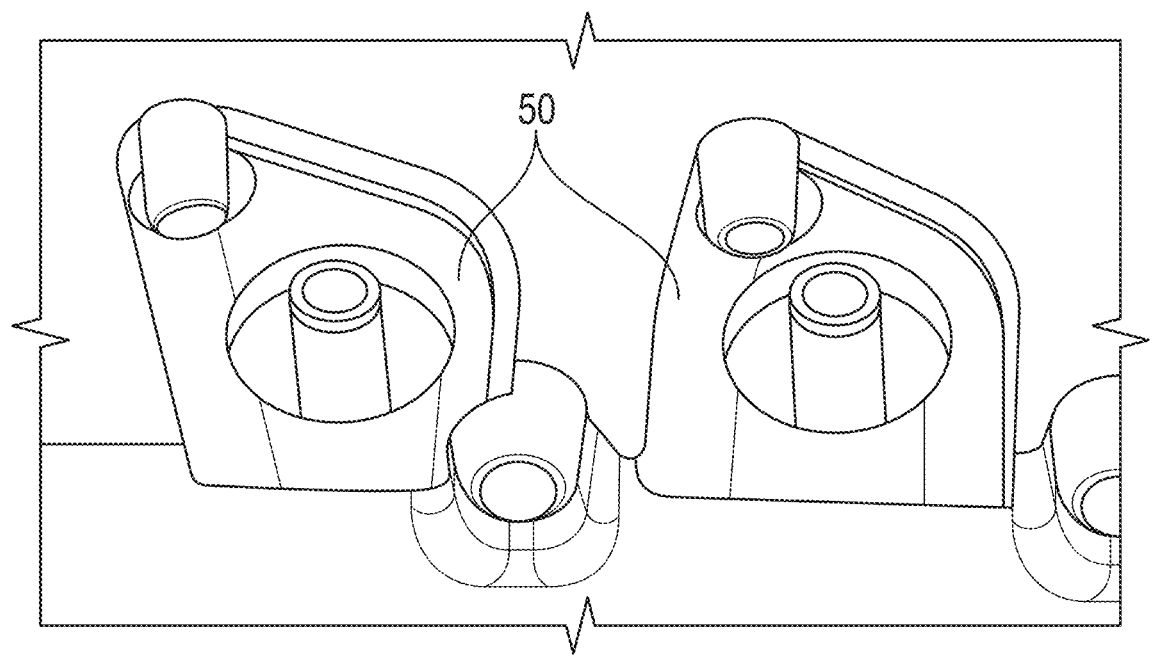
FIG. 9 is an enlarged view of a portion of the improved channel plate showing the recesses around the ports in the channel plate.
Figure 10:
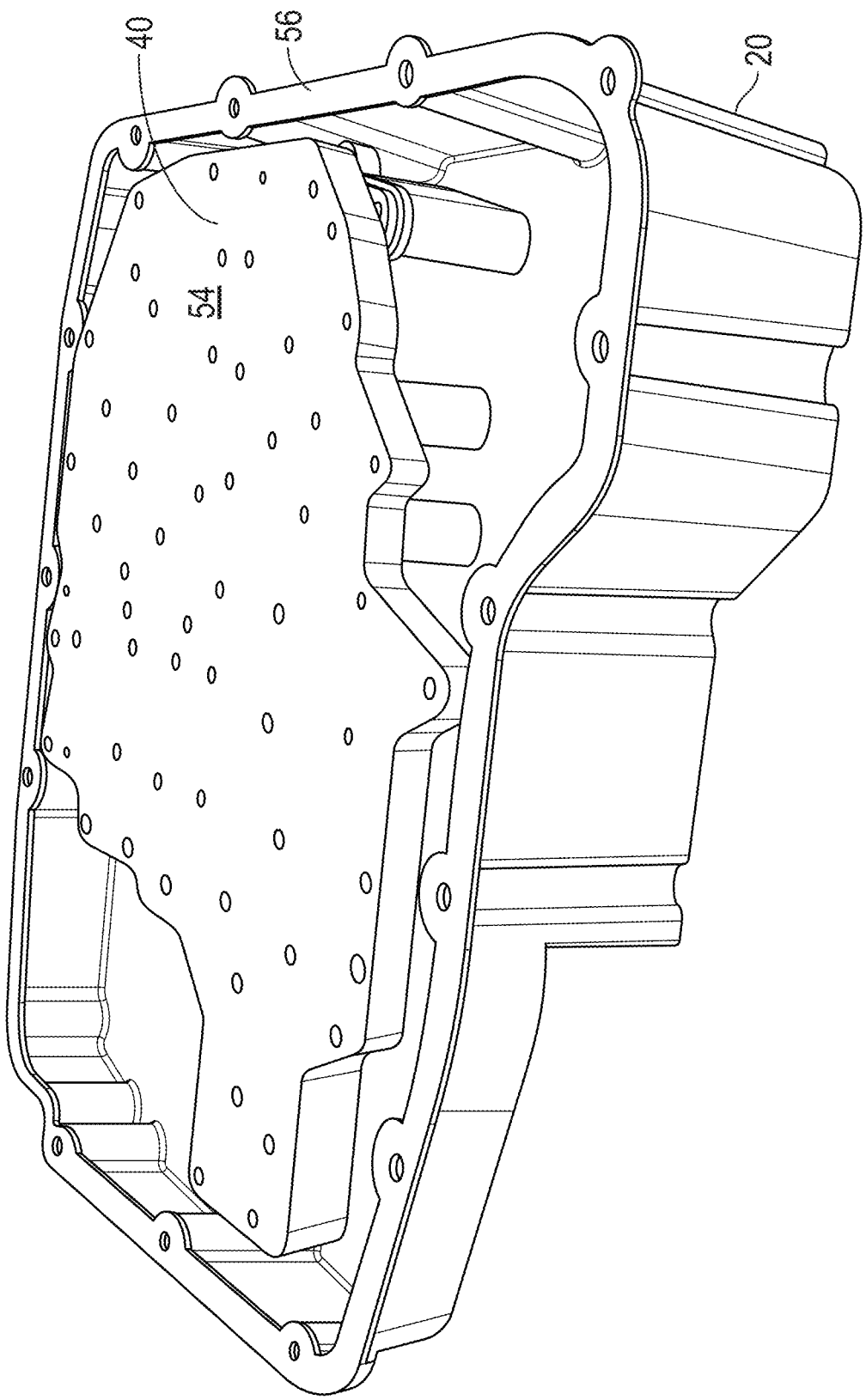
FIG. 10 is a perspective view showing the channel plate of FIG. 8 positioned in the test pan of FIG. 4.
Figure 11:
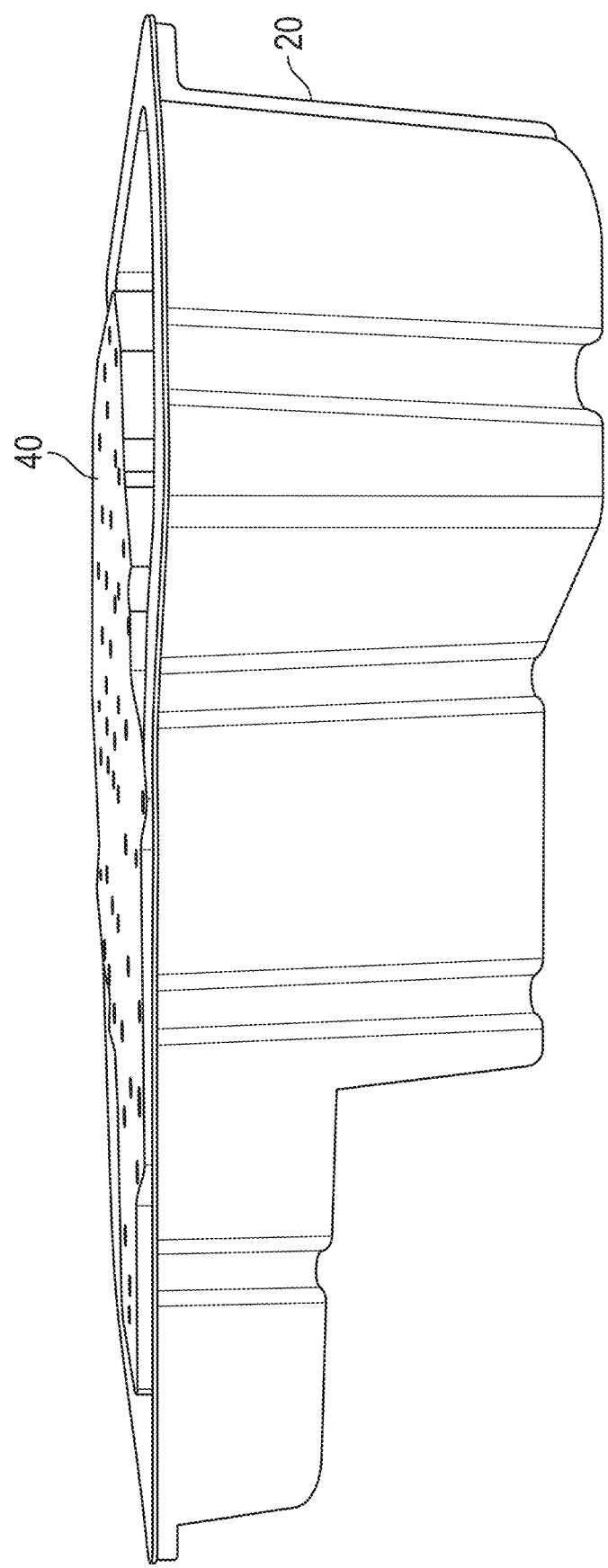
FIG. 11 is a side elevation view of the plate and test pan shown in FIG. 10.
Figure 12:
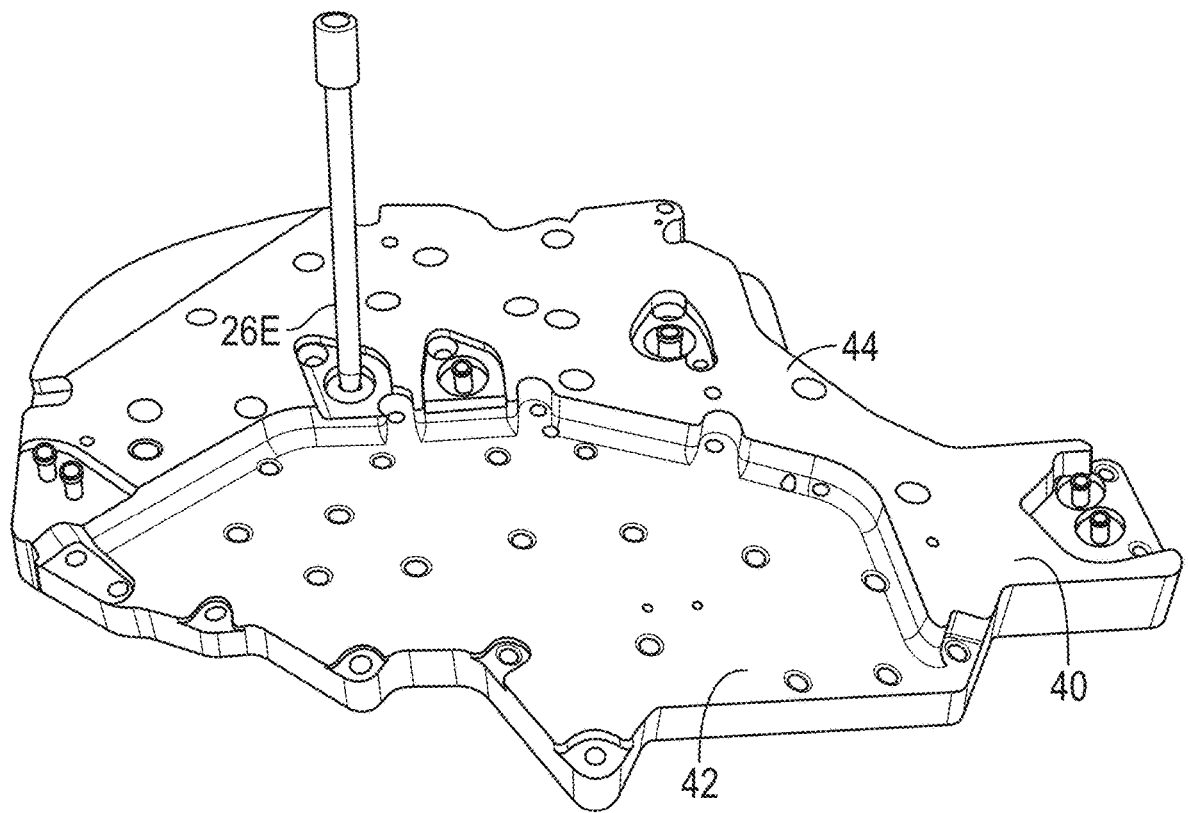
FIG. 12 is a view showing Applicant's channel plate with a pressure gauge adapter tube threaded into one of the ports.

An aftermarket channel plate 30 is shown in FIGS. 6 and 7. The aftermarket plate 30 includes first and second areas 32, 34 having different thicknesses. The thin area 32 has a thickness substantially the same as the thickness of the original equipment plate 14. The second area 34 has an increased thickness, compared to the first area 32. Threaded ports 36A-G, correspond to the ports 16A-G of the original equipment plate 14. The ports 36A-G receive the plugs 18 for normal operation of the engine. The surface immediately surrounding the ports 36A-G are flush or level with the surface of the thickened second area 34. This consistent thickness of the second area 34 causes the aftermarket plate 30 to sit above the top of the test pan 20, as shown in FIG. 7. Since the aftermarket plate 30 does not sit flush within the test pan 20, the test pan does not properly or fully seal with the transmission 10, such that pressure testing cannot be done, or is not accurate. Thus, while the thickened area 34 of the aftermarket plate 30 resists warpage, as an improvement over the original equipment plate 14, the increased thickness creates problems for testing the oil pressure of the clutch packs of the transmission 10.

The improved channel plate of the present invention is designated by the reference 40 in FIGS. 8-12. The plate 40 includes first and second portions 42, 44, similar to the aftermarket plate 30, with the area 44 having a thickness greater than the area 42. The thickness of area 42 is substantially the same as the thickness of the original equipment channel plate 14. The plate 40 includes ports 46A-G, similar to the ports 16A-G of the plate 14. The ports 46A-G are threaded to receive the pressure test adapters 26A-G. The plate 40 includes recesses 50 around each of the ports 46. Each port 46A-G includes a removable plug 48 for the normal operation of the transmission. Plugs 48 are removed for the pressure test. For ports 46A, 46B and ports 46C, 46D, the recess 50 extends around each pair of ports. The depth of each recess 50 substantially matches the upper surface of the first area 42. The recesses 50 are formed by machining material from the plate 40 around the ports 46 A-G.

When the test pan 20 is substituted for the original pan 12 of the transmission 10, the recesses 50 receive the tops of the standpipes 22, such that the plate 40 resides within the test pan 20, with the channel surface 54 of the plate 40 being flush with the top edge 56 of the test pan 20. Thus, the test pan 20 can be sealingly mounted to the transmission 10, without a space or gap, as with the aftermarket plate 30.

The thickened second area 44 of the plate 40 eliminates the warpage of the plate due to high temperatures and pressures during transmission operation.

The plate 40, with the thickened area 44 and the port recesses 50, overcomes the problems of the original equipment plate 14 and the aftermarket plate 30, and allows oil pressure testing using the conventional test pan 20.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A transmission channel plate, comprising:
   a first area having opposite upper and lower surfaces;
   ports extending through the first area and adapted to receive an adapter for pressure testing;
   a recess around each port whereby the transmission plate is adapted to mount flush within a pressure test pan.

2. The transmission channel plate of claim 1 further comprising a second area having opposite upper and lower surfaces defining a thickness less than that of the first area.

3. The transmission channel plate of claim 2 wherein each recess having a depth extending to a level of the upper surface of the second area.

4. The transmission channel plate of claim 1 wherein the recesses are located even with the upper surface of the second area.

5. The transmission channel plate of claim 1 wherein the recesses are located on the channel plate so as to receive standpipes on the pressure test pan.

6. In combination, an automatic transmission having clutch packs, and a pressure test pan mounted on a bottom portion of the transmission, and further comprising:
   a plate mounted to the bottom portion of the transmission and received in an upper end of the pressure test pan;
   the plate having ports communicating with the clutch packs;
   the pressure test pan having hollow standpipes aligned with the ports;
   each port on the plate having a recess around each port for receiving one of the standpipes such that the plate sits flush inside the test pan;
   an adapter sized to fit through one of the standpipes and having an upper end threadably connected to one of the ports; and
   a pressure gauge connected to a lower end of the adapter for measuring pressure of one of the clutch packs associated with the port to which the adapter is connected.

7. The combination of claim 6 wherein the plate has first and second areas having different thicknesses.

8. The combination of claim 7 wherein the first area is thicker than the second area, and the ports are located in the first area.

9. The combination of claim 8 wherein the recesses extend to the thickness of the second area.

10. The combination of claim 7 wherein the recesses are formed on a bottom surface of the plate.

11. A channel plate for use in an automatic transmission and a specialized pressure test pan having standpipes through which a pressure gauge adapter extends, the channel plate comprising:
    a plurality of ports extending through the plate and positioned so as to align with the standpipes of the pressure test pan;
    recesses extending around the ports so as to receive upper ends of the stand pipes, whereby the channel plate will reside flushly in the pressure test pan.

12. The channel plate of claim 11 wherein one of the recesses surrounds two adjacent ones of the ports.

13. The channel plate of claim 11 wherein the recesses have a depth to allow the channel plate to sit inside the test pan without extending above an upper edge of the test pan.

14. The channel plate of claim 11 wherein each port has a diameter greater than a diameter of an upper end of the standpipes.

15. The channel plate of claim 11 wherein each recess is larger than the standpipe.

* * * * *